(12) United States Patent
Patel

(10) Patent No.: US 6,795,708 B1
(45) Date of Patent: Sep. 21, 2004

(54) CONVERGENT WIRELESS COMMUNICATION SYSTEM

(76) Inventor: Jayesh Patel, 4367 Chaucer Ct., Livermore, CA (US) 94550

( * ) Notice: Subject to any disclaimer, the term of this patent is extended or adjusted under 35 U.S.C. 154(b) by 278 days.

(21) Appl. No.: 09/791,724

(22) Filed: Feb. 26, 2001

(51) Int. Cl.$^7$ .......................... H04Q 7/20; H04B 7/212

(52) U.S. Cl. ...................... 455/450; 370/348

(58) Field of Search ........................ 455/450; 370/348

(56) References Cited

U.S. PATENT DOCUMENTS 5,896,376 A * 4/1999 Alperovich et al. ........ 370/348

* cited by examiner

*Primary Examiner*—William Cumming
(74) *Attorney, Agent, or Firm*—Lau & Associates; Michael N. Lau

(57) ABSTRACT

The present invention is a global wireless network also can be called a convergent box that can interface with existing tele-communication systems so as to enable the existing tele-communication systems to handle the increasing demands of wireless communication.

6 Claims, 14 Drawing Sheets

800

| GPRS 802 | WCDMA 804 | BILLING 806 | PSTN 808 | TDMA 810 | BROADBAND 812 | WAP 813 | CONTROLS 814 | CONTROLS 816 |

FIG.8

CONVERGENT WIRELESS COMMUNICATION SYSTEM

BACKGROUND OF THE INVENTION

Significant growth in the demand of wireless voice and data services, worldwide deregulation in the telecommunication industry, and global availability of different frequency licenses are bringing about fundamental changes in the wireless telecommunication industry. These fundamental changes give rise to new industries such the as Wireless Internet Usage, the Short Message Service (SMS) and the multimedia services. Due to the rise of these new industries, the wireless infrastructure market is poised for explosive growth. Initially, the growth will primarily be driven by convergence of cellular phones, personal digital assistance (PDA) and the Internet. There will be increasing demands for fast data transfers in the forms of voice, audio, and text, either through cellular phones or other mobile equipment. In addition, consumers are expected to demand video data over their cellular phones in the immediate future. Even though the existing wireless infrastructure cannot meet these demands, it is nevertheless extremely well poised for low cost upgrades so as to meet these demands. Innovation in the telecommunication industry will bring about tremendous change in personal lifestyle and ways for people to conduct business.

Despite of this optimistic outlook, wireless carriers face a number of challenges with the existing infrastructure as well as the next generation of wireless infrastructure. The existing infrastructure is unable to meet the demands for high bit rate services. In addition, the existing infrastructure cannot support large volumes of data demanded by mobile and multimedia markets. Customers want to combine mobility with multimedia and hence, demand higher bandwidth and new data services. The next generation specifications such as 3G, UMTS, etc. are targeted toward meeting these demands. This specification will result in an increase in demand for hardware that is both flexible and capable of handling multimedia packet data as well as voice data. In short, existing carries face a colossal amount of uncertainty with next generation services, including which path to take and what to do once they get there.

Mobile service providers are looking for a low cost solution that would avoid complete overhaul of their equipment so as to protect and give leverage to their existing investments. A smooth transition to next generation systems is a must for many of these service providers if they want to maintain their competitive edge.

In addition, increased competition had resulted in aggressive pricing due to reduced average airtime revenue per subscriber. As an upgrade provider, it is imperative to understands the need to increased revenue by attracting new customers, encouraging subscriber MOU (minutes-of-use) growth, and deploying value-added, revenue-generating features such as unified messaging and network-based intelligent agents, as well as support for data applications.

SUMMARY OF THE INVENTION

The present invention has the flexibility to provide service to Voice and Data to traditional PSTN and IP backbone networks. The distributed architecture system is easily scaleable for small to large deployment for wireless carriers. The architecture delivers interoperability between core network and external networks with support of many protocols including TCAP, MCAP, MAP, SS7, Q.931, MGCP, SIP, (FEED MORE PROTOCOLS).

BRIEF DESCRIPTION OF THE DRAWING

FIG. 8 illustrates various cards being installed in the convergent box of the present invention.

DETAILED DESCRIPTION OF THE PRESENT INVENTION

Figure 1:
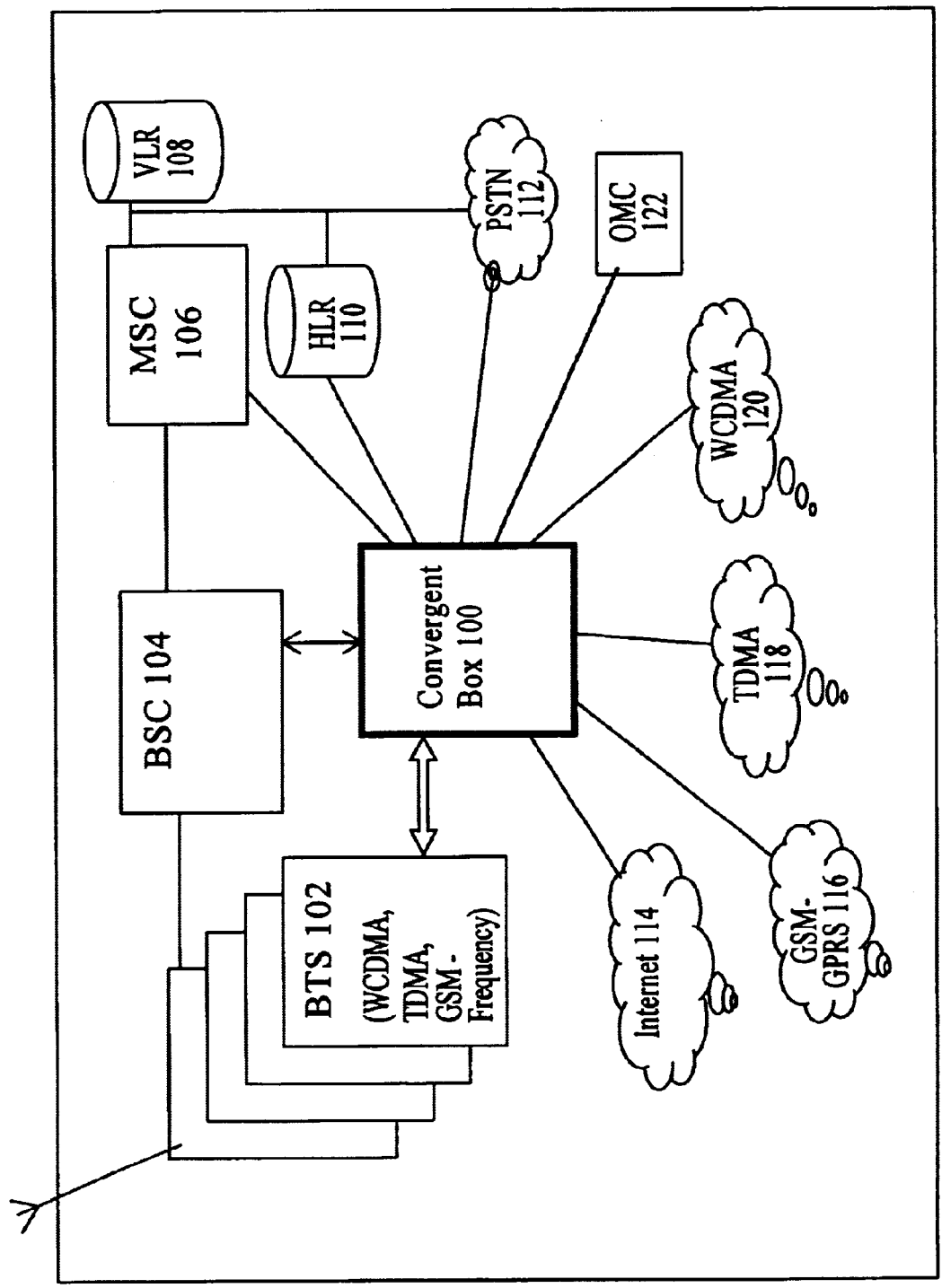
FIG. 1 illustrates a diagrammatic view of the relationship between the present invention of a convergent box and a first communication system environment.

FIG. 1 illustrates a diagrammatic view of the relationship between the present invention and a first communication system environment. The present invention is the convergent Box 100. In this communication system environment, there is a based transceiver station (BTS) 102, a base station controller (BSC) 104, a mobile switching center (MSC) 106, a visitor location register (VLR) 108, a home location register (HLR) 110, a public switched telephone network (PSTN) 112, an Internet 114, a global system for mobile communications and generalized packet radio service (GSM-GPRS) 116, a time division multiple access (TDMA) 118, a wide code division multiple access (WCDMA) 120, and an operation maintenance center (OMC) 122. The convergent box is interconnected with these various systems as shown by the representative connections. The convergent box supports multiple carrier frequencies like those for GSM, TDMA, WCDMA-2000 networks. The convergent box also supports voice and data services not only limited to GSM to GSM global network access, but also to GSM to WCDMA global network access. Carriers can configure the convergent box according to their frequency licenses and their business partnership with competitors to access other networks. Besides supporting basic voice and data services, the convergent box also supports call controls, registration, roaming for voice and data, billing, internal as well as external operability amongst various networks. The convergent box is able to interface with most wireless element and the box is scalable from both hardware and software perspectives.

The Base Transceiver Station (BTS) 102 contains Radio Frequency carriers to handle various frequency ranges. It is able to transmit to and receive from signal of a cellular subscriber. The Base Station Controller (BSC) 104 provides interface between BTS 102 and MSC 106 to provide call controls and management. BSC 104 is also connected to multiple other BTSs. The Mobile Switching Center (MSC) 106 is a telephone switching exchange to handle mobile subscriber traffic, including both originating and termination. The Visitor Location Register (VLR) 108 is a subscriber database, which is dynamically providing help for roaming features such as temporary access to other network. The Home Location Register (HLR) 110 is also a subscriber database. It is a static and master database. Its function is to provide assistance to registration and verification processes.

Figure 2:
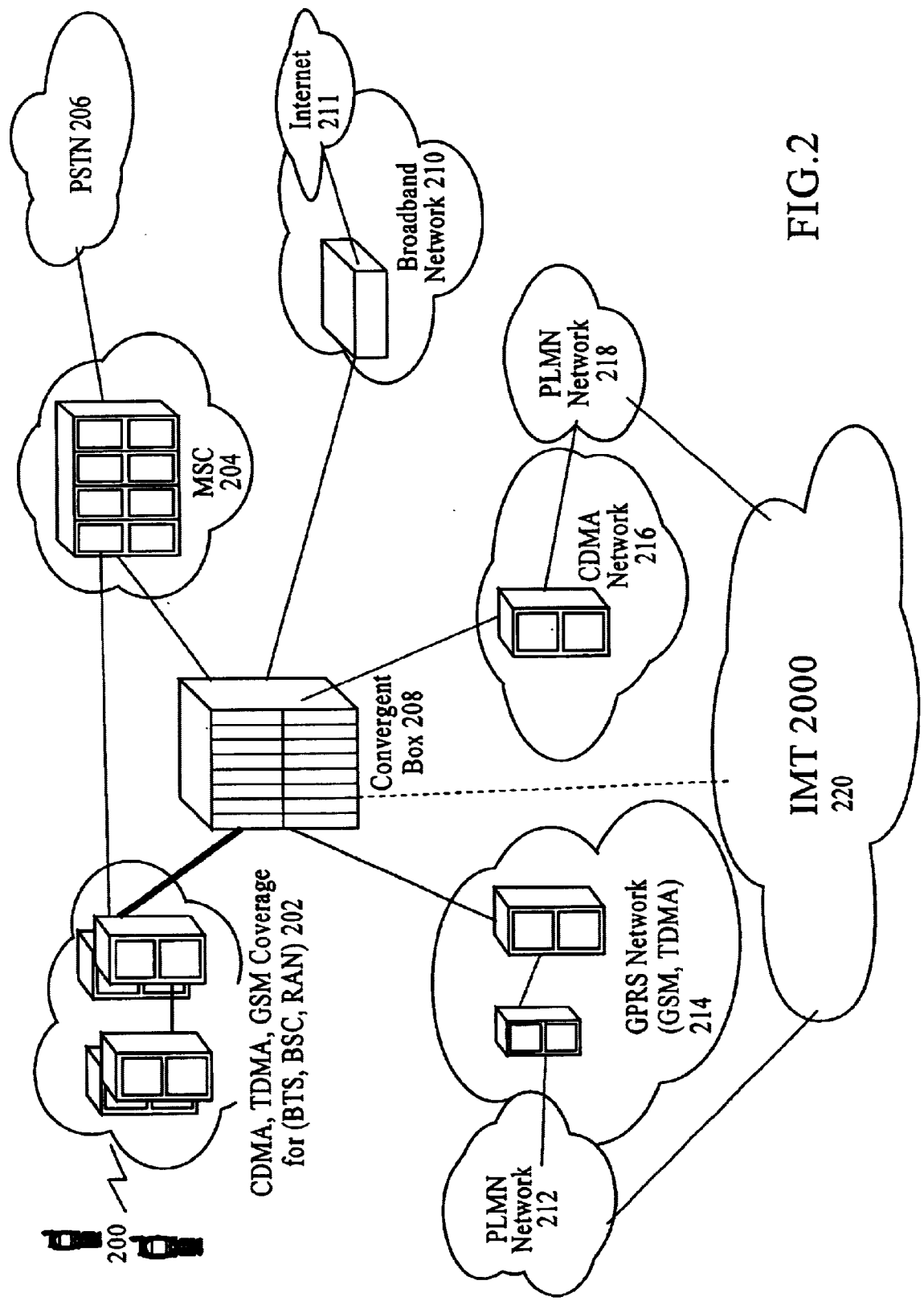
FIG. 2 illustrates a diagrammatic view of the relationship between the present invention of a convergent box and a second communication system environment.

FIG. 2 illustrates a diagrammatic view of the relationship between the present invention and a second communication system environment. This environment includes a pair of cellular devices in wireless connection with a network 202 including a CDMA, TDMA, GSM with extended coverage for BTS, BSC, and RAN. The environment also includes a MSC 204, a PSTN 206, a convergent box 208, a broadband network 210 a PLMN network 212, a GPRS network 214 with GSM and TDMA, an CDMA network 216, a PLMN network 218, and an IMT 2000 220. As shown, the convergent box 208 is centrally interconnected with the various networks.

Figure 3:
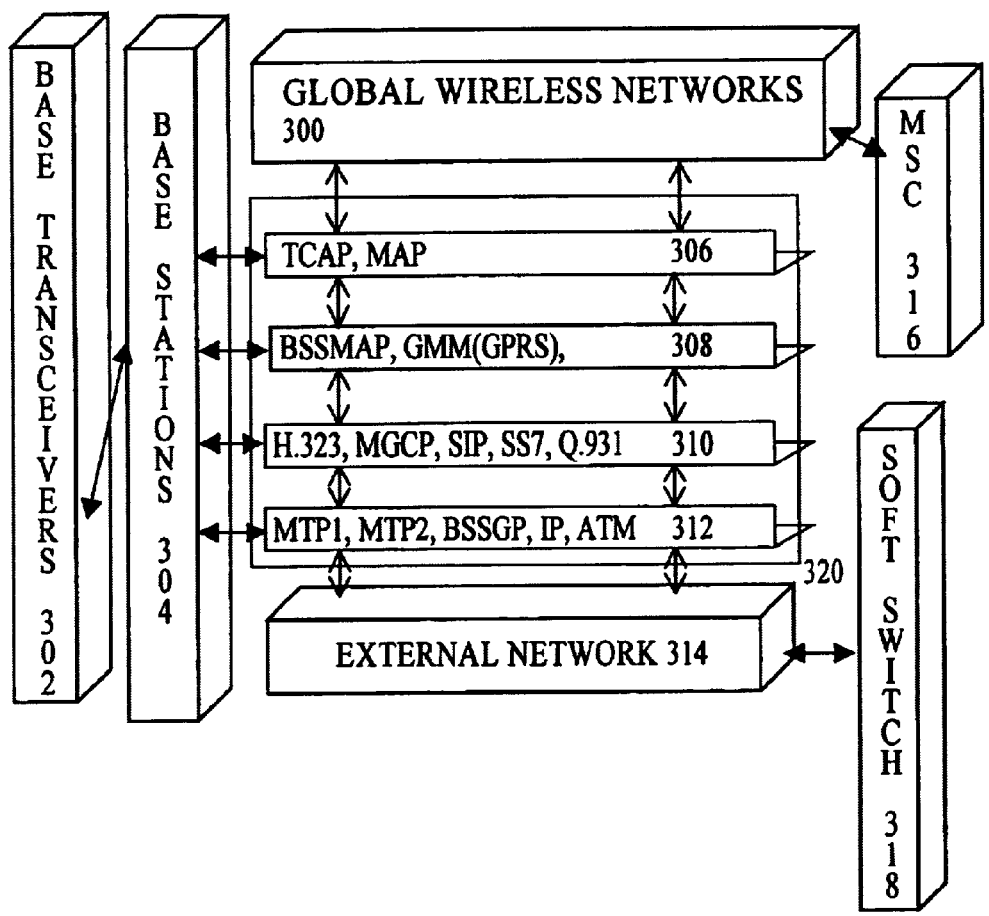
FIG. 3 illustrates a diagrammatic view of a protocol stack of the present invention.

FIG. 3 illustrates a diagrammatic view of a protocol stack of the present invention. Base transceivers 302 interface between various wireless devices and base stations 304. The base stations 304 serve as interfaces with a cluster of software protocol stack 320. The stack 320 encompasses a group 306 comprising transaction capabilities application part (TCAP), and a mobile application part (MAP); a group 308 comprising a base station system management application part (BSSMAP), and a general packet radio services mobility management (GPRSGMM); a group 310 comprising a H.323, media gateway control protocol (MGCP), a session initiation protocol (SIP), a SS7, and a Q.931; and a group 312 comprising a message transfer part layer 1 (MTP1), a message transfer part layer 2 (MTP2), a base station system management application part (BSSMAP), an internet protocol (IP), and an asynchronous transfer mode (ATM). The group 306, group 308, group 310 and group 312 can interactively communicate with each other. The stack 320 can also interactively communicate with a Global wireless Network 300, a MSC 316, a soft switch 318 and an external network 314.

Figure 4:
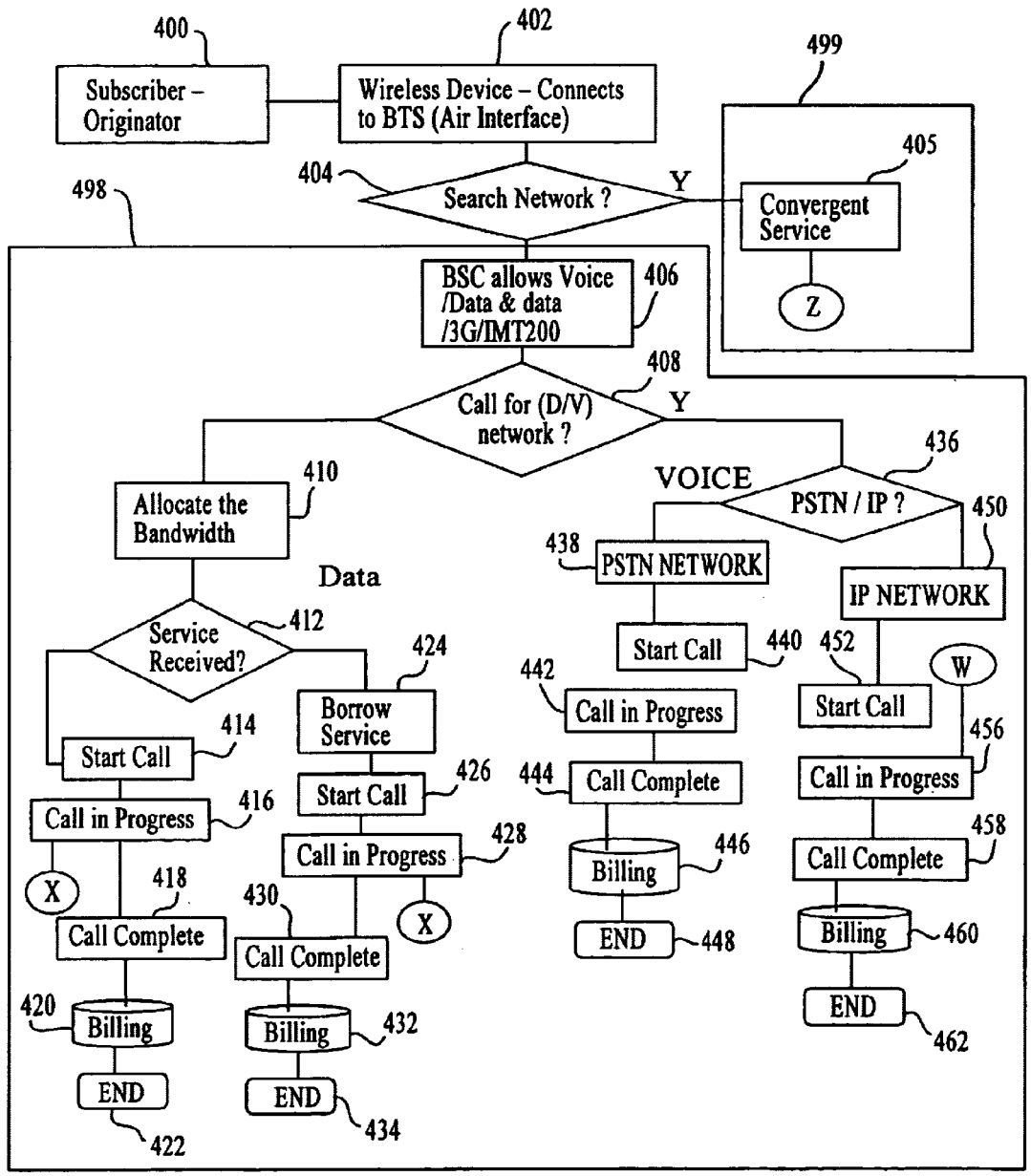
FIG. 4 illustrates a flow chart diagram explaining the system logic flow of the present invention.
Figure 6:
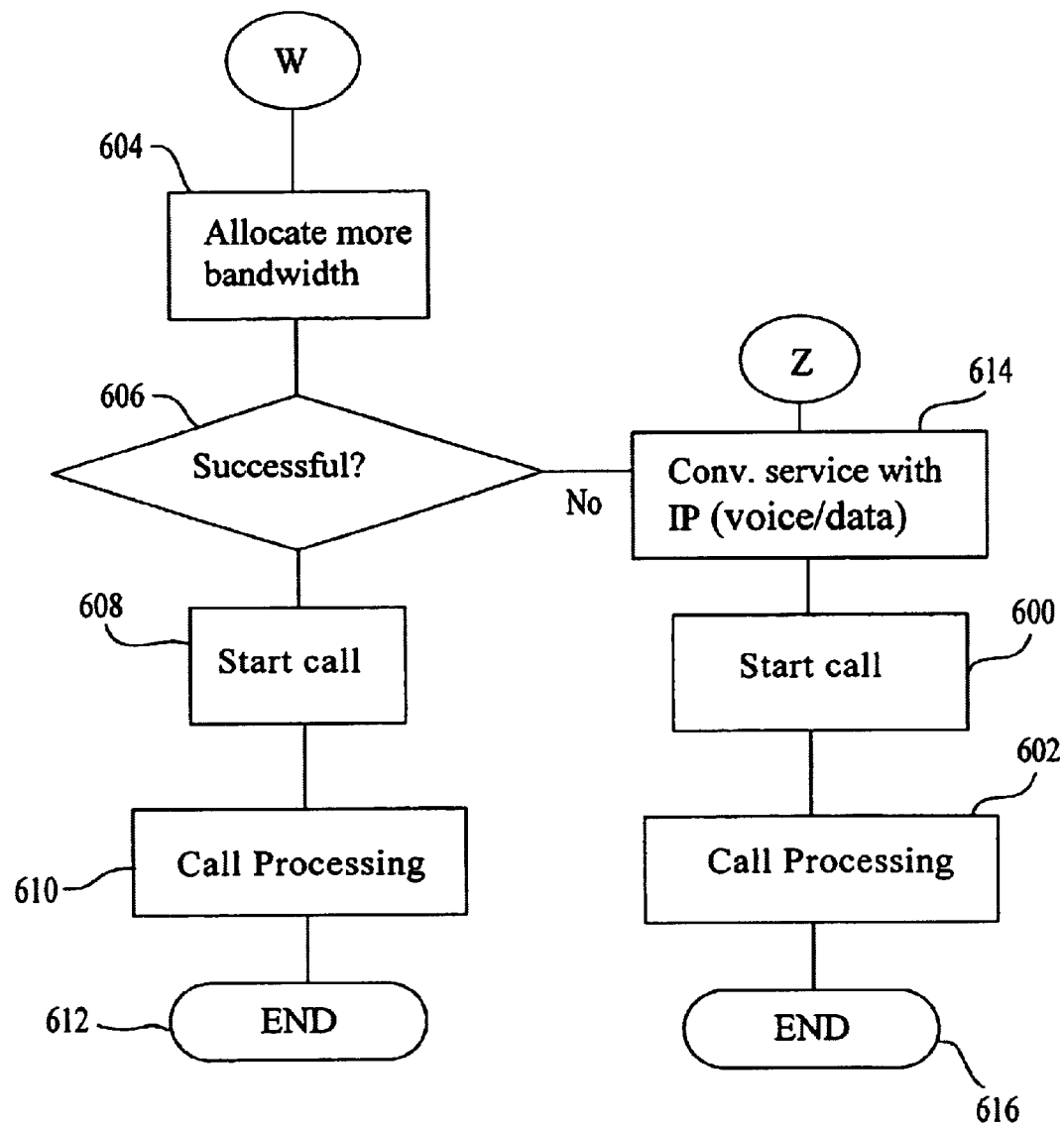
FIG. 6 illustrates a flow chart diagram supplementing the system logic flow of FIG. 4.

FIG. 4 illustrates a flow chart diagram explaining the system logic flow of the present invention. The diagram as a whole shows two main branches, a primary wireless network, and a convergent service network. Whenever a subscriber is unable to access a primary wireless network, the convergent service network will be made available. When a subscriber initiates a service request via a wireless device, as shown in step 400, a wireless contact is made with a base transceiver station (BTS), as shown in step 402. A determination is made on whether the requested service should be fulfilled by the primary wireless network 498 or the convergent service network 499. The determination could be based on network availability, resources needed to fulfill the requested service, preferences indicated by the subscriber, cost differential analysis based on the services requested, among other factors, as shown in step 404. Should it be determined that the convergent service network is needed, the service requested will be fulfilled by the convergent service network 499. As shown in steps 600 and 602 in FIG. 6, all service requests thereof will be processed under procedures within the convergent service network 499.

Should it be determined that the service request should be handled by the primary wireless network 498 at step 404, a base station card (BSC) will decide based on the service request whether it should be fulfilled by a circuit or a packet switched network. A PSTN network may be chosen to provide a fast access, or a PLMN may be chosen for a wide bandwidth, as shown in step 406. A determination will then be made whether the service request requires a voice network or a data network, as shown in step 408. If a data network is required, a proper bandwidth will be allocated, as shown in step 410. Thereafter, a determination is made on whether a proper amount of bandwidth is available, as shown in step 412. If a proper amount of bandwidth is available, a calling process will be initiated, as shown in steps 414 and 416. At which point, a determination is made on whether the calling process is successful, as shown in step 500. If yes, then proper resources will be allocated as shown in step 502 and the calling process will be carried to fruition, as shown in steps 504 and 506. Should it be determined that a calling process is not successful, then the convergent service network 498 will be chosen to provide the requested service until fruition, as shown in steps 508, 510 and 512. Regardless of which network provides the requested service, at the conclusion of a call, billing records will be kept, as shown in steps 418, 420 and 422.

Figure 5:
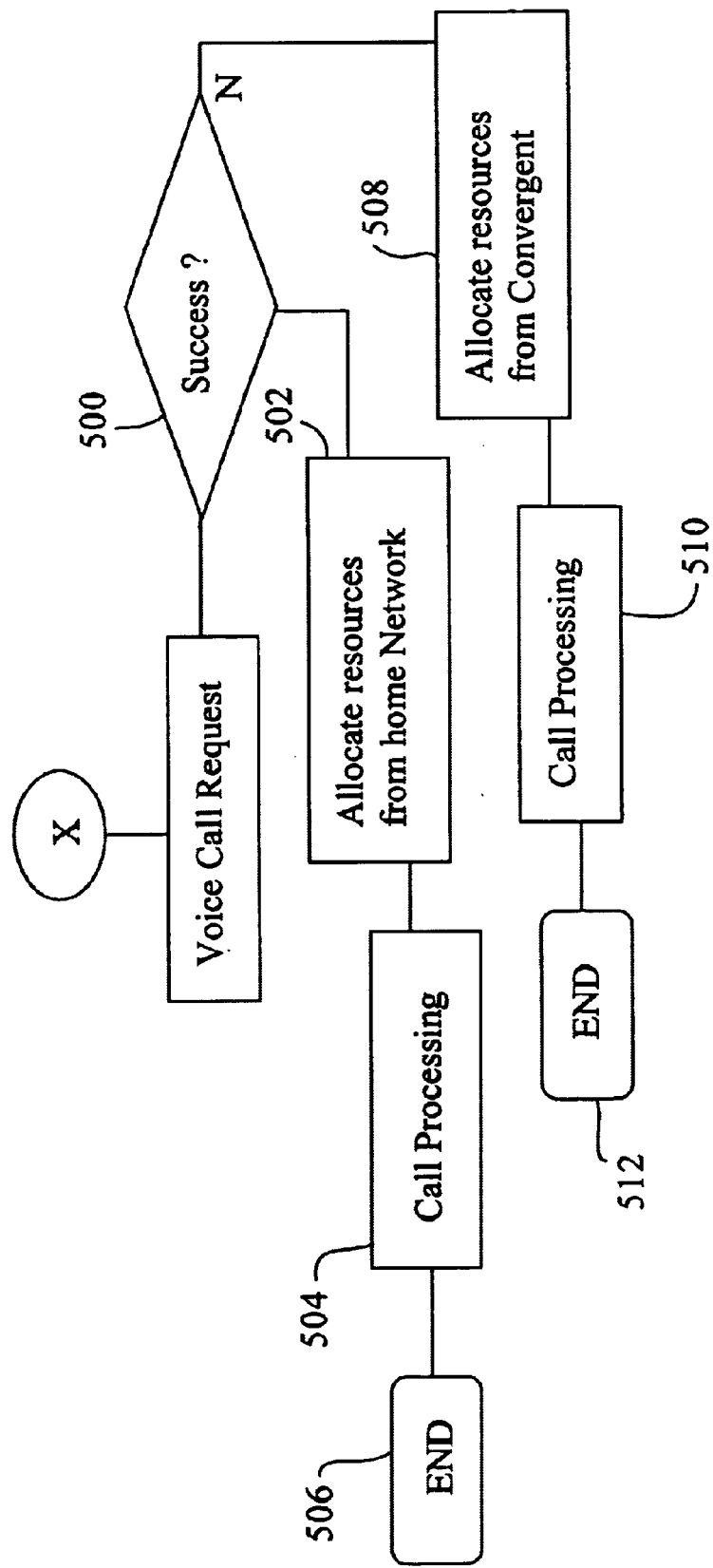
FIG. 5 illustrates a flow chart diagram supplementing the system logic flow of FIG. 4.

Should it be determined at step 412 that there is insufficient amount of bandwidth, then a borrowed service will be utilized, as shown in step 424. Typically but not always, borrowed services are needed when a killer application is encountered. Borrowed services will be provided by a carrier with a similar cost structure, as long as the contacted carrier is able to fulfill the demands of the requested service. Borrowed services will likely be handled by a 3G or an IMT2000 based network with access to PLMN and Internet via high speed switches, gateways and fiber optic backbone networks. A calling process will be initiated as shown in steps 426 and 428. Steps 500, 502, 504, 506, 508, 510 and 512 in FIG. 5 will be employed. At the conclusion of a call, billing record will be kept, as shown in steps 430, 432 and 434.

Should it be determined at step 408 that a voice service is desired, then a further determination is made on whether the service request should be handled by a PSTN or an Internet, as shown in step 436. If PSTN network, then a calling process will be initiated until fruition followed with a recordation of billing record, as shown in steps 438, 440, 442, 444, 446 and 448. If Internet, then a calling process will be initiated until fruition followed with a recordation of billing record, as shown in steps 436, 450, 452, 456, 458, 460 and 462. During the call in progress at step 456, it is possible that more bandwidth is needed. More bandwidth may be allocated, as shown in step 604. If the bandwidth is successfully allocated, then the service request is provided until fruition, as shown in steps 606, 608, 610 and 612. If the proper amount of bandwidth is not successfully allocated, then the convergent service network is employed, as shown in steps 614, 600, 602 and 616.

Figure 7:
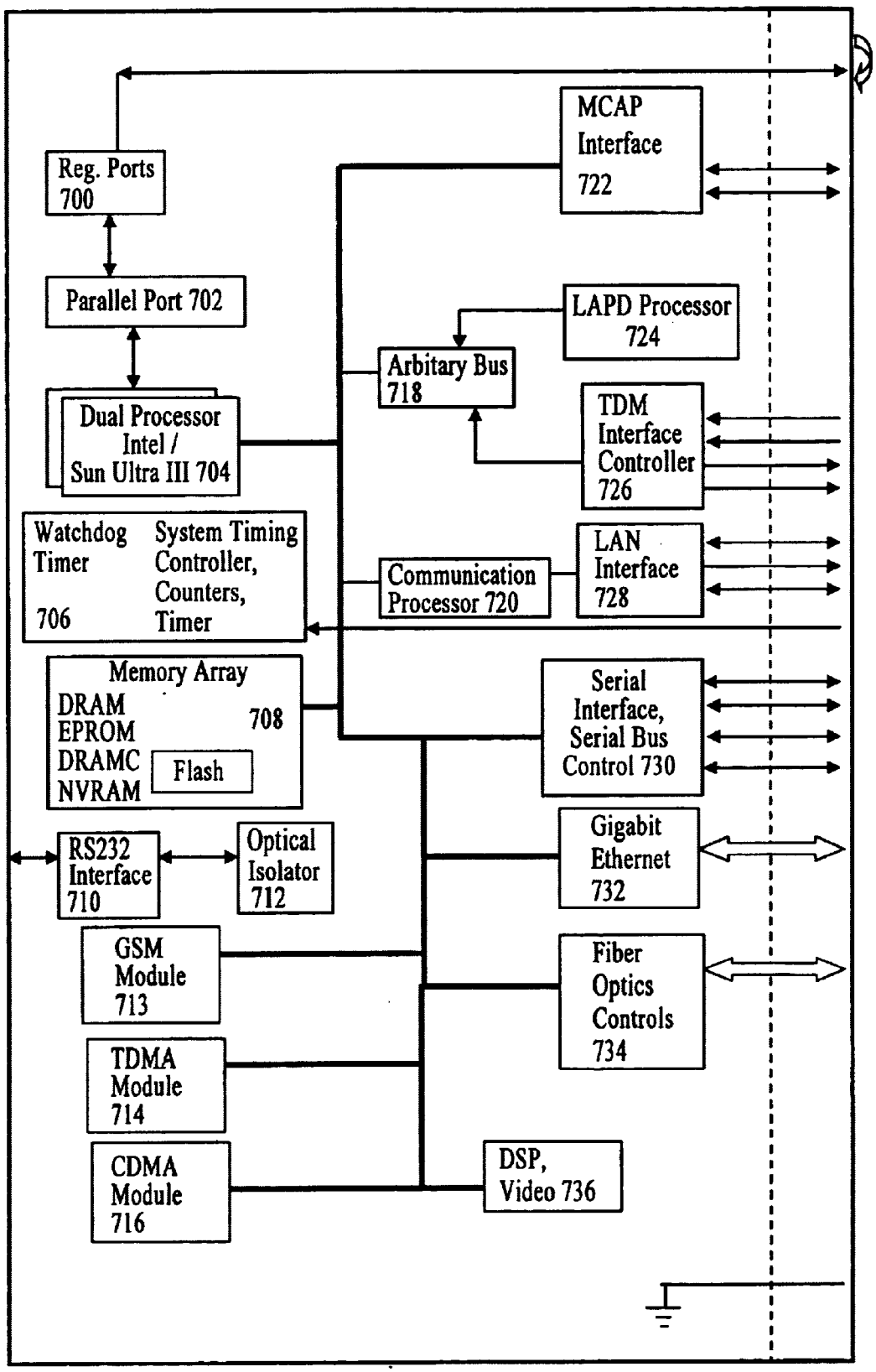
FIG. 7 illustrates a high speed-processing card (HSProc) enabling implementation of the present invention.

FIG. 7 illustrates a high speed-processing card (HSProc) of the present invention. This card may interactively communicate with local area networks, Ethernet, among others. Contained therein the card is a register ports module 700, a parallel port module 702, a dual processor module 704, a timer 706, a memory 708, a serial port interface module 710 with an optical isolator 712, a GSM module 713, a TDMA module 714, a CDMA module 716, an arbitary bus module 718, a communication processor module 720, a MCAP 722, a LAPD processor 724, a TDM interface controller 726, a LAN Controller module 728, an interface controller 730, a Gigabit Ethernet 732, a fiber optics controller 734 and a graphic controller 736.

FIG. 8 illustrates details of a convergent box of the present invention. As shown, the box is configured to house various cards. By way of an example, two control cards 814 and 816, a WAP card 813, a broadband card 812, a TDMA card 810, a PSTN card, a Billing card 806, a WCDMA card 804 and a GPRS card 802 are installed. The convergent Box is designed by standards conforming to that of 3GPP, 3GPP2 and IMT 2000. Regarding GPRS 802, WCDMA 804 and TDMA 810 cards, interface will provide connectivity to incoming traffic from BTSs/Radio Network or BSCs and external network beyond wireless networks. Interface support features include voice, data and multimedia applications. These cards possess features like call processing, mobility management and resource management of channels (voice and data). All connections will establish end-to-end IP connectivity through gateways, routers to legacy networks by T1/E1, Frame Relay, OC-3, OC-12 interface. Each card will have different kinds of ports and custom configured to fit various networks. Regarding billing card 806, for every call and every access to network, this interface will generate report for every connection that has been established, software from a $3^{rd}$ party may be integrated.

Regarding connectivity with PSTN card, this card supports circuit-switched data for voice, especially for 2G network. If subscribers and carriers are capable to handle data, then service can be made available via software features, gateways and soft switch integration from certified vendors.

Regarding the support of current WAP based network, these cards will support all data calls, and upcoming WAP based applications.

Regarding control cards 814 and 816, traffic shaping, analyzing control are all managed by software and most of incoming and outgoing traffic can be monitored by these cards.

Figure 9:
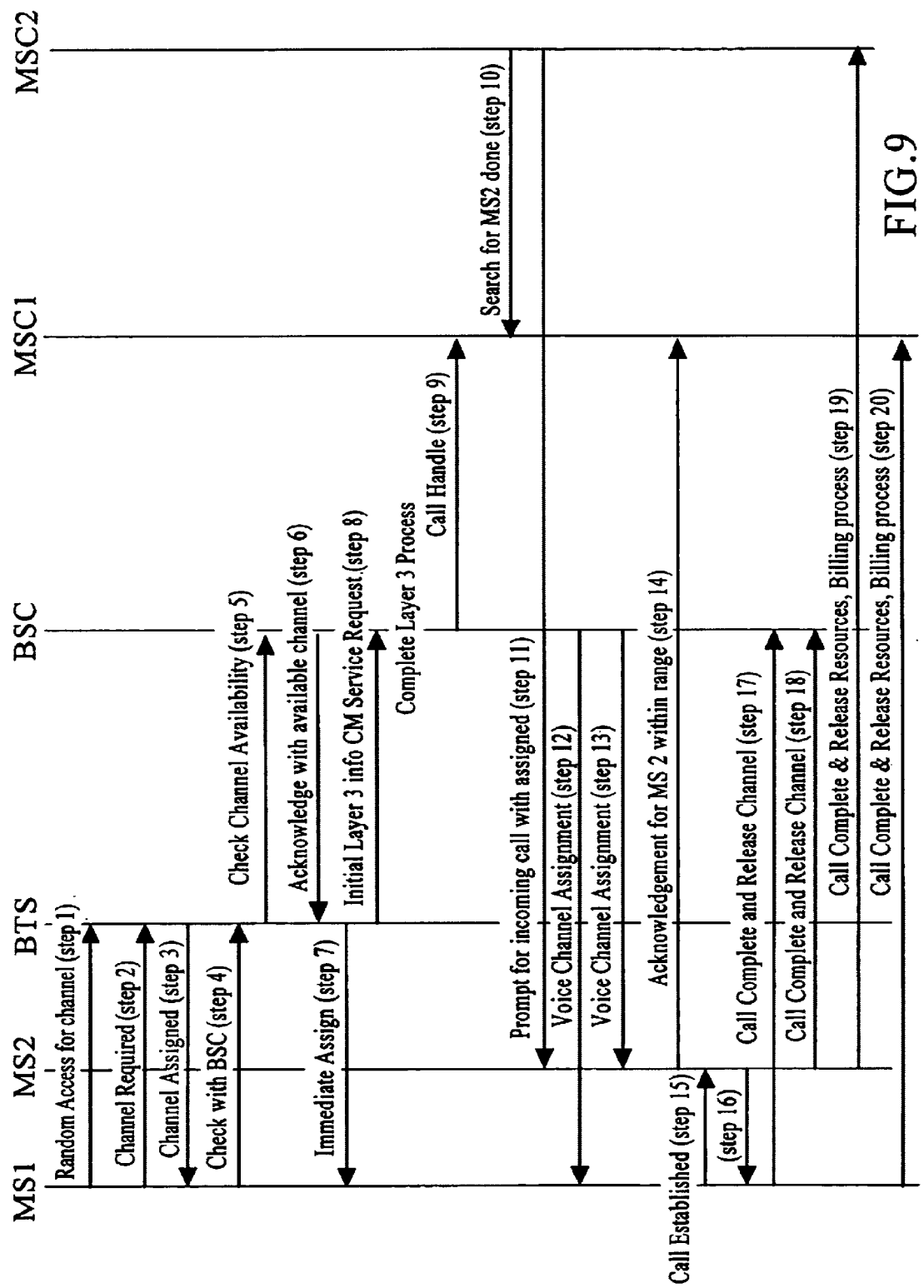
FIG. 9 illustrates an information flow diagram of a communication system depicting a voice call from a first mobile subscriber to a second mobile subscriber.

FIG. 9 illustrates an information flow diagram of a communication system depicting a voice call from a first mobile subscriber to a second mobile subscriber. As shown the information flow diagram is between the first mobile subscriber MS1, the second mobile subscriber MS2, the base transceiver station BTS, the base station controller BSC, the first mobile switching center MSC1 and the second mobile switching center MSC2.

MS1 initiates a random access for a channel at step 1. Depending upon whether a priority is given to the strength of a signal, proximity between MS1 and BTS, pre-arranged assignment based on service region, or other factors, one BTS among many acknowledges and decides to respond to the random access request. Along with the random access request, a channel request is also sought after by MS1, as shown in step 2. In response thereto, BTS assigns a channel to MS1 as shown in step 3. MS1 then makes a checking request to BSC via BTS, as shown in steps 4 and 5. The checking requests for information regarding subscriber information, bandwidth, channel, etc. that was prearranged for MS1. Possessed with the relevant requested information, BSC provides the relevant requested information to BTS, as shown in step 6. BTS then immediately assigns a channel commensurate with the prearrange setup to MS1, as shown in step 7.

At step 8, BTS initiates a layer 3 information call management service request to BSC. This request will initiate various types of prearranged activities such as establishing links, call processing, set timer, set events, MTP, etc. A call handle will be initiated from BSC to MSC1, as shown in step 9. Based on the telephone number dialed by MS1, a destination will be determined. In conjunction with other intelligent processes which is not shown in this diagram, a proper MSC2 will begin to search and make contact with MSC1, as shown in step 10. MSC2 will prompt for incoming call with assigned channel to MS2, as shown in step 11. Thereafter, a voice channel is assigned by BSC to each of MS1 and MS2, as shown in steps 12 and 13. At step 14, an acknowledgement to indicate that MS2 is within range is extended to MSC1 from MS2. A call establishment between each of MS1 and MS2 is completed, as shown in steps 15 and 16. MS1 and MS2 can effectively communicate with each other. Once the communication is completed, MS1 and MS2 will each separately inform BSC of call completion and release the assigned channel, as shown in steps 17 and 18. Release of resources and separate recording of billing information will be done in steps 19 and 20.

Figure 10:
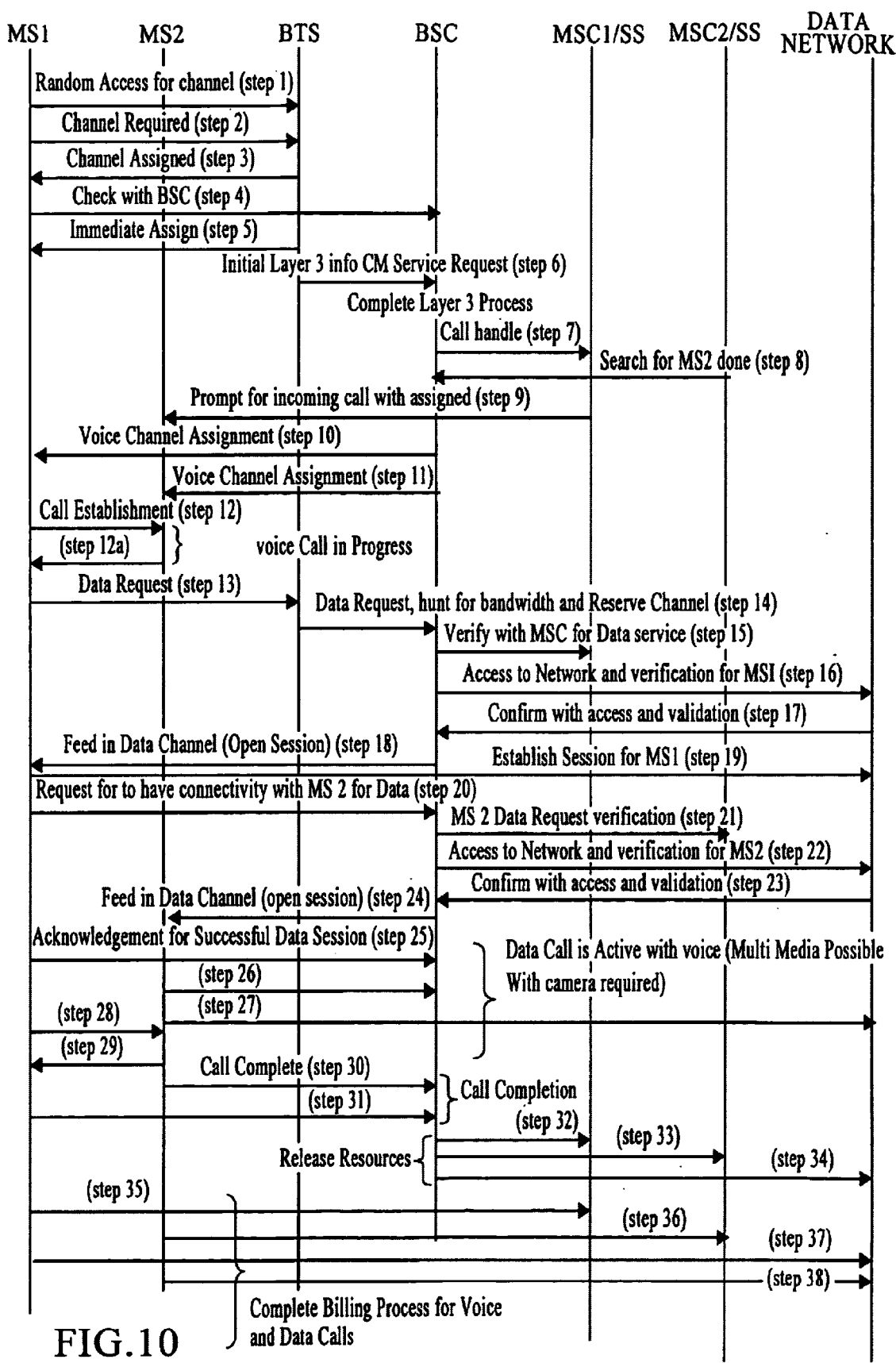
FIG. 10 illustrates an information flow diagram a communication system depicting a voice call followed with a data call from a first mobile subscriber to a second mobile subscriber.

FIG. 10 illustrates an information flow diagram of a communication system depicting a voice and data call from a first mobile subscriber to a second mobile subscriber over either a 2G or a 3G switch of the present invention. As shown, the invention flow diagram depicts interactions between a first mobile subscriber MS1, a second mobile subscriber MS2, a base transceiver station BTS, a base station controller BSC, a first mobile switching center MSC1, a second mobile switching center MSC2, and a data network DN. As depicted in this diagram, a voice connection between MS1 and MS2 is made first. Should the need arise, a data connection between MS1 and MS2 is made later.

At step 1, a random access attempt to reach a channel is made by MS1. Typically, either a BTS closest to MS1 or a BTS receives the strongest signal from MS1 acknowledges the random access attempt. The BTS that acknowledges the random access attempt also acknowledges a channel request of MS1, as shown in step 2. In response to the channel request, a channel is assigned by BTS to MS1, as shown in step 3. For the purpose of enabling BSC to provide proper control and management to BTS and MSC, a checking request is made by MS1 to BSC, as shown in step 4. The type of control and management commensurate with a pre-arrangement is immediately assigned to MS1 by BTS, as shown in step 5. For high level controls, a layer 3 information call management service request for a complete layer 3 process is initiated from BTS to BSC, as shown in step 6. A call handle is then provided by BSC to MSC1/SS, as shown in step 7. Based on the telephone number dial and other intelligent feature, a proper MSC2/SS makes a search from MSC2/SS to BSC, as shown in step 8, then MSC1/SS makes a prompt for incoming call with assigned to MS2, as shown in step 9. BSC follows with making a separate voice channel assignment to MS1 and MS2, as shown in steps 10 and 11. MS2 will also make an acknowledgement that MS2/SS is within range. MS1 and MS2 can then intercommunicate with each other, as shown in steps 12 and 12a.

Anytime during the voice communication, out of necessity, MS1 initiates a data request service with BTS, as shown in step 13. In response to the data service request, BTS hunts for proper bandwidth and available reserve channel from BSC, as shown in step 14. BSC verifies with MSC1/SS the need of a data service, as shown in step 15. BSC proceeds with an access to the DN, as shown in step 16. DN confirms with access and validation such as identification, password, network-provisioning etc. with BSC, as shown in step 17. BSC proceeds to feed a data channel to MS1, and MS1 directly access DN, as shown in steps 18 and 19. MS1 continues by making a request to obtain connectivity with MS2 to BSC, as shown in step 20. BSC in turn initiates a MS2 data request verification to MSC2/SS as well as access to DN and provide verification for MS2, as shown in steps 21 and 22. In turn DN confirms with access and validation with BSC, as shown in step 23. Thereafter, BSC feeds a data channel to MS2, as shown in step 24. MS1 and MS2 separately make acknowledgement for a successful data connection to BSC, as shown in steps 25 and 26. MS2 makes a direct connection with DN, as shown in step 27. MS1 and MS2 can then intercommunicate with each other, as shown in steps 28 and 29.

When MS1 and MS2 are finished in their communication, they may separately inform BSC so that termination procedure may follow, as shown in steps 30 and 31. BSC will separately release all resources to MSC1/SS, MSC2/SS and DN, as shown in steps 32, 33 and 34. MS1 will complete billing process for voice and data calls with MSC1/SS and DN, as shown in steps 35 and 37. MS2 will also complete billing process for voice and data calls with MSC2/SS and DN, as shown in steps 36 and 38.

Figure 11:
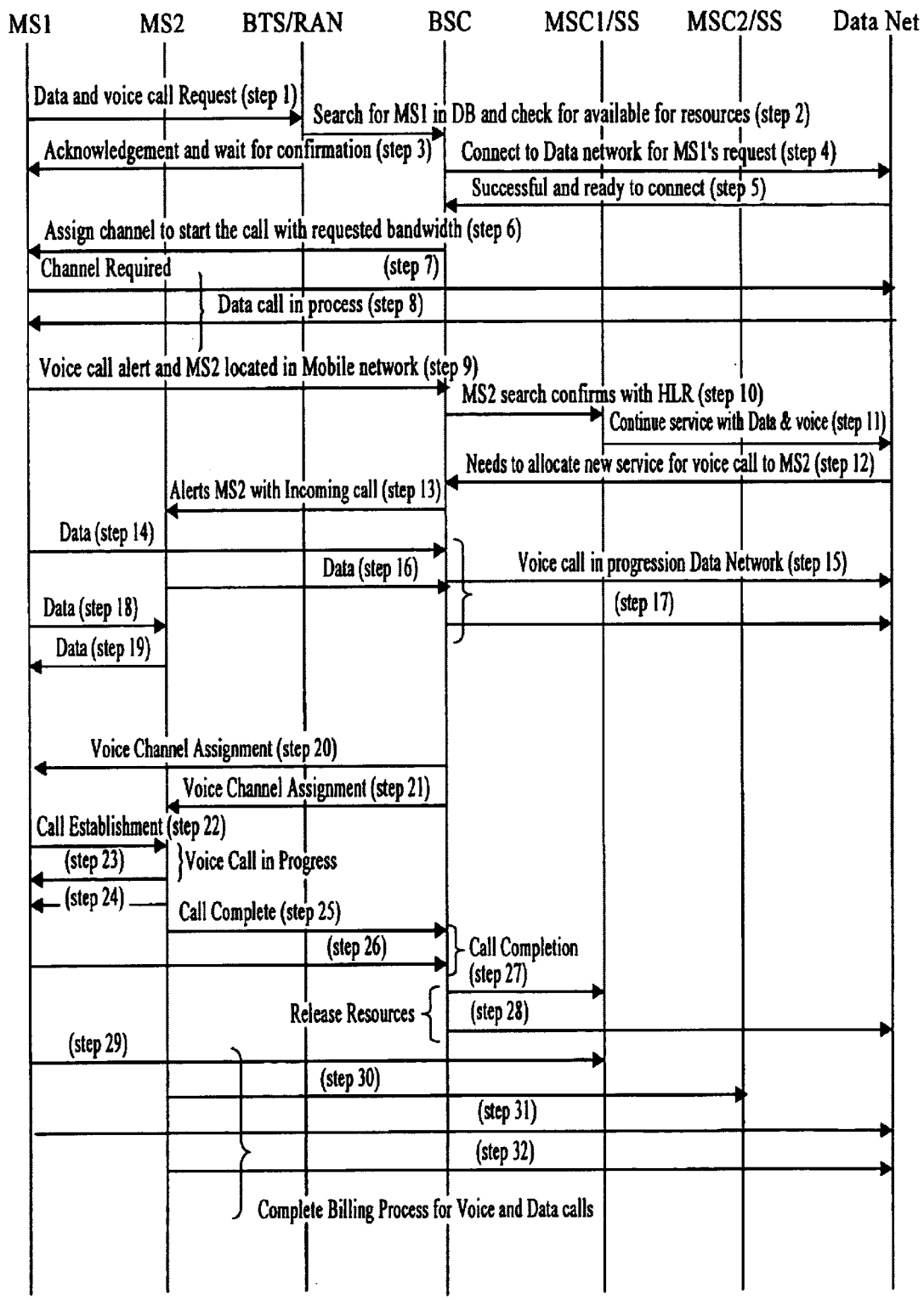
FIG. 11 illustrates an information flow diagram a communication system depicting a simultaneously voice and data call from a first mobile subscriber to a second mobile subscriber.

FIG. 11 illustrates an information flow diagram of a communication system depicting a simultaneously voice and data call from a first mobile subscriber to a second mobile subscriber. This is an embodiment with one channel that supports both voice and data. As shown in step 1, a first mobile subscriber (MS1) initiates a voice and data service request to a base transceiver station/radio access network (BTS/RAN). Upon receiving the request, the BTS/RAN contacts a base station controller (BSC) for the purpose of determining the service plan the MS1 has enrolled into, as shown in step 2. The BTS/RAN also informs MS1 that the service request has been received, as shown in step 3. The BSC makes contact with a data network (NT) in preparation to provide service to MS1, as shown in step 4. Once protocols are established, the data network informs BSC that connection is established, as shown in step 5. The BSC then assigns a channel with services commensurate with the enrolled service plan to MS1, as shown in step 6. Thereafter, MS1 and DN may intercommunicate with each other with full capability of voice and data, as shown in steps 7 and 8. However, due to the fact that a second mobile subscriber (MS2) has not yet been contacted, intercommunication between MS1 and DN will most likely be with data only.

A voice call alert is initiated from MS1 to BSC to determine the whereabouts of MS2 from a mobile network, as shown in step 9. The search for MS2 is confirmed with a home location register (HLR), as the BSC communicates with a first mobile switching center/soft switch (MSC1/SS), as shown in step 10. MSC1/SS contacts DN in preparation of providing service to MS2, as shown in step 11. DN then communicates with BSC to allocate voice service to MS2, as shown in step 12. NSC then alerts MSC with an incoming call, as shown in step 13. After MS1 and MS2 both communicate with BSC, BSC communicates with DN, as shown in steps 14, 15, 16 and 17. MS1 and MS2 will then be able to communicate with each other, as shown in steps 18 and 19. Voice communication will also take place between MS1 and MS2, as shown in steps 20, 21, 22, 23 and 24. As calls and data exchanges are completed, both MS1 and MS2 inform the BSC, as shown in steps 25 and 26. BSC in turn releases all resources, as shown in steps 27 and 28. Billing records will be kept for voice and data communication of MS1 and MS2, as shown in steps 29, 30, 31 and 32.

Figure 12:
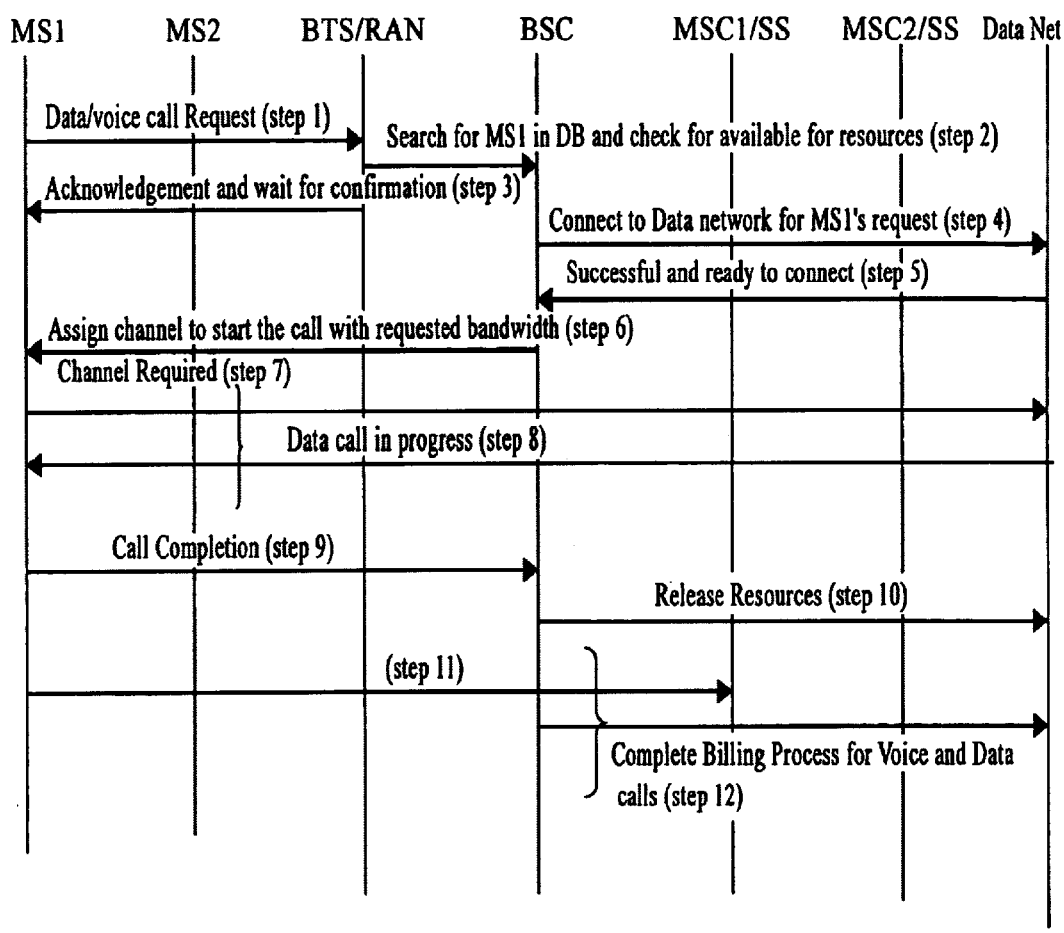
FIG. 12 illustrates an information flow diagram a communication system depicting a data call from a first mobile subscriber to a second mobile subscriber.

FIG. 12 illustrates an information flow diagram a communication system depicting a data call communication between a first mobile subscriber (MS1) and a data network (DN). This could be a situation where a wireless device is used to gain access to an internet. Even though there is no voice communication between MS1 and MS2 as depicted in FIG. 11, there is still both voice and data services. This setup would allow MS1 to access, for example, internet email and voice mail. As shown in step 1, MS1 initiates a data call request to a BTS/RAN. The NTS/RAN in turn contacts BSC to check the enrolled service plan of MS1, as shown in step 2. BTS/RAN acknowledges to MS1 that the request has been received and is being processed, as shown in step 3. Meanwhile, BSC contacts DN in preparation of providing service to MS1, as shown in step 4. Upon successful protocol communication, DN informs BSC, as shown in step 5. BSC then assigns a channel with a requisite bandwidth to MS1, as shown in step 6. MS1 and DN can intercommunicate with each other, as shown in steps 7 and 8. Upon completion of all communications, MS1 informs BSC, as shown in step 9. BSC then releases all resources for the connection to DN, as shown in step 10. Billing records for the service will be kept, as shown in step 12.

Figure 13:
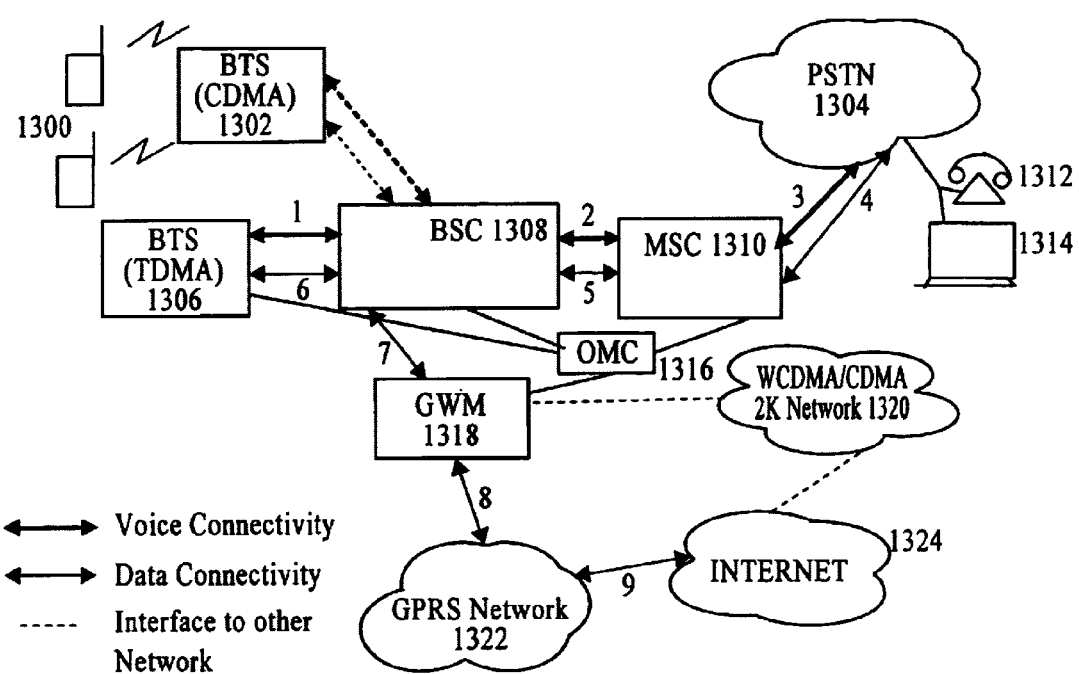
FIG. 13 illustrates a network diagram showing a global wireless network of the present invention is related to various connectivity relationships over voice and data calls.

FIG. 13 illustrates a network diagram showing various connectivity relationships over voice and data calls. This network diagram includes a pair of mobile subscriber devices 1300, a BTS (CDMA) 1302, a PSTN 1304, a BTS (TDMA) 1306, a BSC 1308, a MSC 1310, a telephone 1312, a network 1314, an OMC 1316, a global wireless network (GWN) 1318, a WCDMA/CDMA 2000 network 1320, a GPRS network 1322 and an Internet 1324. They are interconnected via voice connectivity, data connectivity and interface to other network as shown.

In order to support 2.5G GPRS network 1322 and Enhanced GPRS (EGPRS) network for 3G wireless systems, changes are required within the BSC 1308, and other wireless network elements like MSC 1310 and external network. A new packet control unit (PCU) that directs the data traffic to the GPRS network 1322 or the EGPRS network is required. GWN 1318 develops a next generation BSC module 1308 which has an integrated PCU. The data traffic will be forwarded to the GPRS network 1322 or the EGPRS network via another network element (GWN box) with the following features:

A next generation BSC module with an integrated PCU.

A GWN network element (GWN box aka convergent box) which interfaces to the new BSC and the GPRS network or the EGPRS network.

Initially, the GWN Box offers services to Class A terminals of GPRS networks. Subquent GWN Box will support all classes of 2.5G GPRS terminals and 3G wireless terminals.

The next generation BSC with the integrated PCU interfaces with the GWN network element via high speed link(s) such as frame relay and ATM interface. Another key feature is a support of simulataneous voice and data multiplexing within the same session. This is accomplished with smart built-in GWN software algorithm along with PCU hardware, to allow both voice and data session to co-exist independent of each other. Thus, providing the required support for the next generation GPRS terminals that with the capabilities to send voice and data traffic simultaneously.

One important aspect of consideration here is the support for multiple air interface standards. The support for mutiple air interface standards can also be built within this new BSC. As we can see this determination and decision for multiple air interface standards will be based on existing BSC infrastructure, marketing objectives, and various cost factors thereby allowing for smooth migration to 2.5G GPRS system and to 3G systems.

Although BSC products for 2.5G GPRS and for 3G wireless systems are available from several major wireless suppliers, these products are usually designed for a specific air interface standard and a specific core network. The main reason for using the GWN box is scalability to provide support for multiple air interface standards and multiple core network architectures. It will facilitate data traffic forwarding to 2.5G GPRS network, 3G EGPRS network for WCDMA and Enhanced Mobile IP network for CDMA2000. The GWN supports interfaces to the GPRS network (2.5G or 3G). Modules can be added to interface with Enhanced Mobile IP network for CDMA2000, and Enhanced GPRS network for WCDMA. The GWN network element is a scalable box which will terminate multiple interfaces from the various BSC modules. It supports the termination of the existing BSCs (if required) and the next generation GWN BSC modules.

GWN's BSC module and GWN box supports the GPRS Tunneling Protocols to ensure the security to data network and circuit switch network. GWN network element will also provide secured and virtual connection to other WCDMA network or CDMA2000 network. GWN box have cards for 3G EDGE-TDMA and capable to have access to 2G ANSI TDMA, WCDMA and CDMA2000 to provide packet data service to core networks and interface with base stations. The GWN network element will provide interface to the 2.5G GPRS network or 3G EGPRS network (or Enhanced Mobile IP network if GWN wants to support cdma2000).

Figure 14:
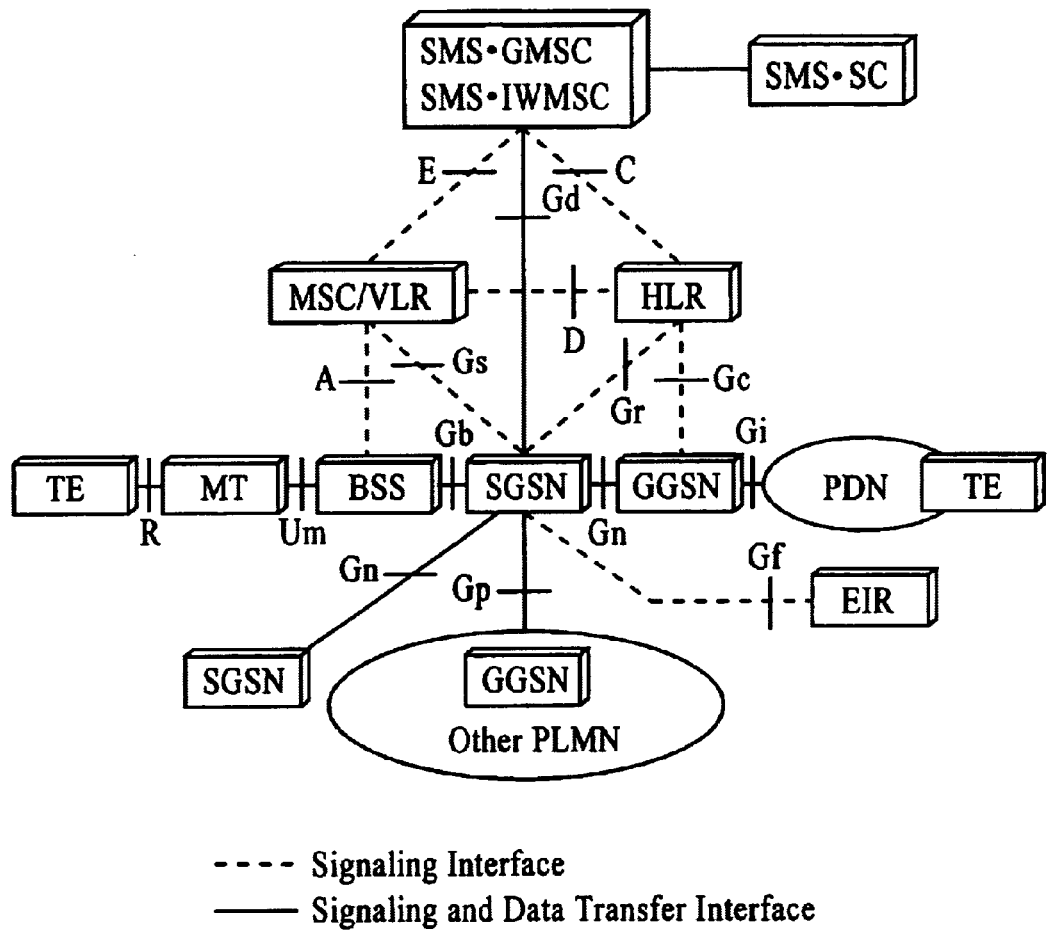
FIG. 14 illustrates a reference model of a SPRS network with SGSN and GGSN by CISCO™.

FIG. 14 illustrates a reference model of a SPRS network with SGSN and GGSN by CISCO™. This figure shows the interfaces 1, 2 and 3 connections to PSTN networks for voice call and interfaces 4,5 and 6 for circuit-switched data calls. These capabilities are managed in BSC with software call controls that enable more bandwidth, support for multiple air interfaces from BTSs, and connects to suitable reference point of SGSN element of GPRS network or EGPRS network through GWN box. Interfaces 7, 8 and 9 adds more flexibility, scalability, interoprability, roaming to GPRS network or WCDMA-EGPRS network or CDMA2000 network. An important characterstic of this architectural view is the migration from circuit-switched network to packet-switched network.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

What is claimed is:

1. A communication system, comprising:
   a first mobile subscriber device initiating a service request;
   a base transceiver station initiating a check for channel availability with a base station controller upon receiving the service request;
   a first mobile switching center;
   a second mobile subscriber device; and
   a second mobile switching center;
   wherein the base transceiver station assigns a first channel to the first mobile subscriber device upon receiving an acknowledgement of an available channel from the base station controller;
   wherein the base station controller initiates a call handle with the first mobile switching center upon receiving a system service request from the base transceiver station; and
   wherein the second mobile switching center initiates a search for the second mobile subscriber device to the first mobile switching center once the first channel is assigned to the first mobile subscriber device.

2. The communication system of claim 1, wherein the base station controller assigns a second channel to the second mobile subscriber device once the second mobile subscriber device is located by the second mobile switching center.

3. The communication system of claim 2, wherein the first mobile subscriber device intercommunicates with the second mobile subscriber device via the first channel and the second channel.

4. The communication system of claim 1, wherein the first mobile subscriber device is a cellular phone.

5. The communication system of claim 1, wherein the second mobile subscriber device is a cellular phone.

6. The communication system of claim 1, wherein the system service request is an initial layer 3 information call management service request.

\* \* \* \* \*